United States Patent [19]

Winkler

[11] Patent Number: 4,510,431
[45] Date of Patent: Apr. 9, 1985

[54] D.C. STEPPED-UP VOLTAGE TRANSFORMERLESS BATTERY CHARGER

[76] Inventor: Harry L. Winkler, P.O. Box 632, Pinehurst, Id. 83850

[21] Appl. No.: 352,110

[22] Filed: Feb. 25, 1982

Related U.S. Application Data

[63] Continuation of Ser. No. 163,926, Jun. 27, 1980, abandoned.

[51] Int. Cl.³ .............................................. H02J 7/00
[52] U.S. Cl. ............................................ 320/1; 320/39
[58] Field of Search ...................... 363/21; 320/1, 39

[56] References Cited

U.S. PATENT DOCUMENTS

| | | | |
|---|---|---|---|
| 3,614,581 | 10/1971 | Frost | 320/21 X |
| 3,775,659 | 11/1973 | Carlsen | 320/21 |
| 4,128,867 | 12/1978 | Heyman | 363/21 |
| 4,311,954 | 1/1982 | Capel | 323/222 |

FOREIGN PATENT DOCUMENTS 1116941  6/1968  United Kingdom ............... 361/104

*Primary Examiner*—William H. Beha, Jr.
*Assistant Examiner*—Judson H. Jones

[57] ABSTRACT

A battery charger that takes energy from a battery and steps-up the voltage to charge another battery.

The direct current, going into the charger's circuit goes through the voltage regulator and then to a switching voltage regulator (the integrated circuit) and a few external components which generates the energy to charge the output capacitor. The output capacitor voltage is controlled by a resistive voltage divider network, and energy stored in the output capacitor is transferred through a diode and a current limiter to charge the battery.

1 Claim, 1 Drawing Figure

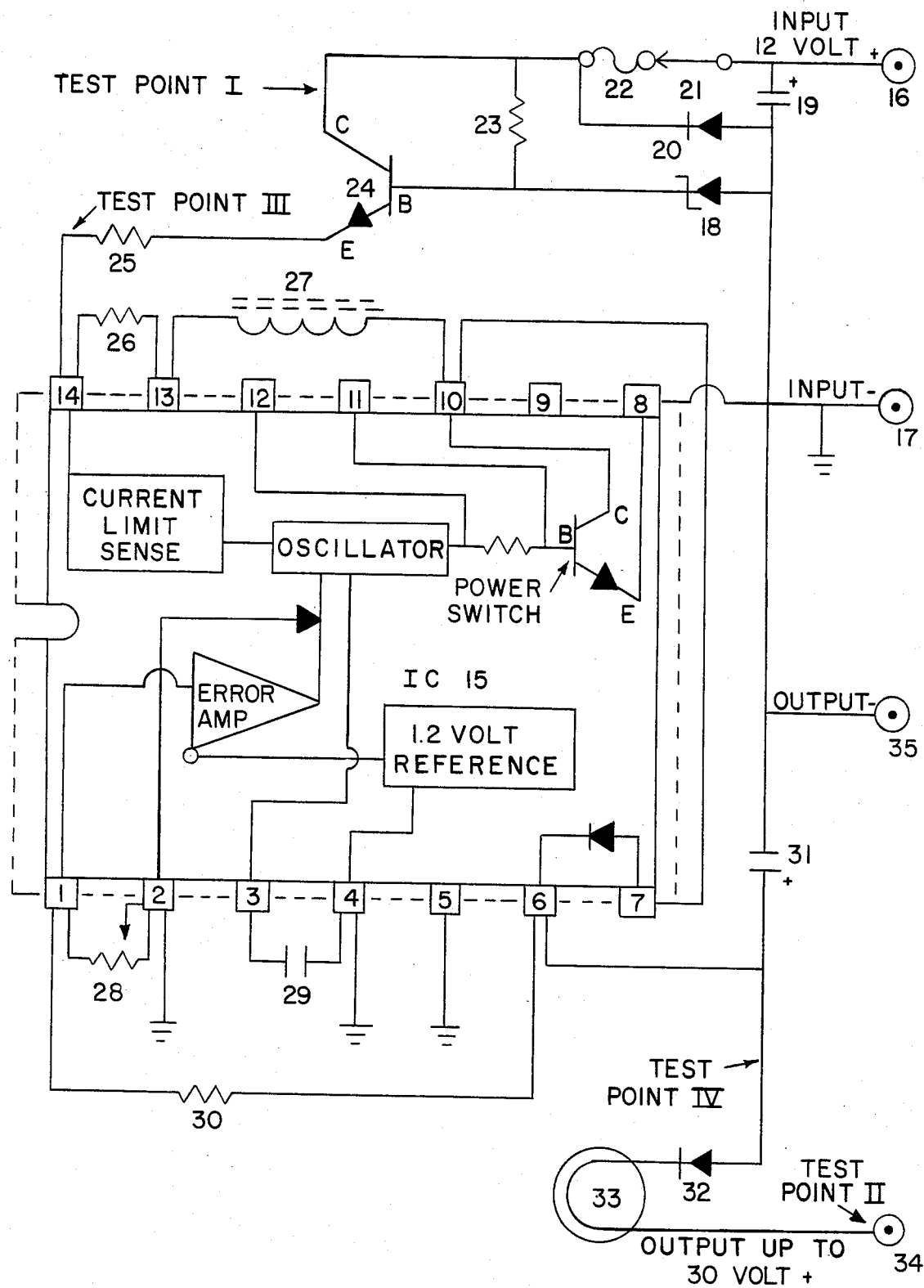

D.C. STEPPED-UP VOLTAGE TRANSFORMERLESS BATTERY CHARGER

This application is a continuation of U.S. Ser. No. 163,926 filed June 27, 1980.

BRIEF SUMMARY OF THE INVENTION

My battery charger takes energy from a battery and steps up the voltage to charge another battery or batteries. The switching system in this battery charger uses the oscillator to turn the power switch transistor ON and OFF. On the oscillator's positive half-cycle, the power switch transistor switches ON and on the oscillator's negative half-cycle, said power switch transistor switches OFF. In this battery charger, by controlling the oscillator's output, you can control how much energy is generated and transferred to charge the output capacitor. Energy from said output capacitor is transferred in series through a diode and a current limiter to charge the battery.

The object of my invention was to work for a new and/or better way of stepping up D.C. voltage to charge another battery or batteries. For example, the 12 volt and 15 volt re-chargable walkie-talkie batteries from a vehicle battery. Further object of my invention was to make this battery charger with a number of desirable features, as will become obvious further in the embodiment.

BRIEF DESCRIPTION OF THE DRAWING

In the drawing, everything shown on the inside of the broken lines indicate the block diagram of the Integrated Circuit (15). Outside of the broken lines indicate a schematic drawing of the rest of the charger's circuit.

DETAILED DESCRIPTION

This battery charger is mainly designed to charge 12 and 15 volt nickel-cadmium batteries for hand held transceivers. The battery charger operates from 12 volts direct current with negative ground. With positive power going into the charger circuit, it goes through the switch (21) and through the fuse (22). The fuse (22) is used to protect the circuit of the charger in case something goes wrong, also for protection from reverse polarity. A rectifier type diode (20) the anode is connected to the ground (17) and the diode (20) cathode is connected to the far side of the fuse (22). When the switch (21) is on and the diode (20) receives reverse polarity, it will short out the fuse (22) thus causing it to blow. This protects the regulator transistor (24) as well as the Integrated Circuit (15) . . . from here on, the Integrated Circuit (15) will be referred to as I.C. (15).

Going on, after power goes through the fuse (22) it goes on in series to the collector of a NPN power type transistor (24) that is used in the voltage regulator. Voltage on the collector stays the same as the input voltage (16) after it goes through the fuse (22). After the power goes through the regulator, the regulator then maintains about 10 volts at the input of the I.C. (15) terminal 14. The regulator gets it's control from a voltage dropping resistor (23) that controls the bias on the base of the regulator transistor (24) which in return controls the emitter of the regulator transistor (24). The voltage dropping resistor (23) is controlled by a Zener diode (18). When the input (16) of the charger circuit has more than 12 volts positive, the zener diode (18) has a voltage break-down region, upon conduction, diverts current from the base of the regulator transistor (24) thereby controlling said transistor's emitter voltage. In order to get the voltage on down to 10 volts at the input of the I.C. (15) terminal 14, an additional resistor (25) is used in series with the regulator.

Going on, power goes from terminal 14 of the I.C. (15) in series through a current limiter resistor (26) and on to terminal 13 of the I.C. (15). There is a current limit sense between terminal 13 and terminal 14 of the I.C. (15) to protect the I.C. (15) from an overload. When terminal 13 drops about 0.7 volt below terminal 14, the sensor will turn the power switch transistor OFF. The I.C. (15) power switch transistor is a NPN type. Also, a portion of the power goes from the current limit sense to the oscillator and energy from the oscillator's output goes in series through a resistor, then on to the base of the power switch transistor. The oscillator controls the bias on the power switch transistor's base. In return, that controls the power switch transistor's output. The emitter of the power switch transistor is connected to terminal 8 of the I.C. (15) then is connected to ground (17). Going back to terminal 13, power goes from terminal 13 in series through a choke (27) and on to terminal 10, then from terminal 10 power goes to the collector of the power switch transistor. Since the oscillator's output is an alternating current, on the positive half-cycle, the power switch transistor switches ON, and on the negative half-cycle, it switches OFF. When said transistor switches ON, this puts a load on the choke coil and when the transistor switches OFF the choke coil induces a small voltage spike and this alternating current is mixed in with the direct current at the terminal 10 end of the choke (27). The choke (27) works to block the alternating current from returning to the power supply (16) while it offers little or no resistance to direct current going through the choke (27).

The following items are used to generate the energy that is used to charge the output capacitor (31): A working oscillator; A resistor (between the oscillator's output and the power switch's transistor base); A power switch transistor; A choke (27); The direct current (16); The negative ground (17); And a rectifier type diode (with the anode end connected to terminal 7 and the cathode end connected to terminal 6). The energy goes from terminal 10 of I.C. (15) to terminal 7 and through the rectifier diode to terminal 6. From terminal 6 on to the positive end of the output capacitor (31). The negative lead of the output capacitor (31) is connected to ground (35). Going back to terminal 6 of I.C. (15), the pulsating direct current from the rectifier is used to charge the output capacitor (31). Due to the resistance between said capacitor and the battery being charged, the capacitor will receive almost or all of said pulsating direct current. Since the energy taken from the capacitor is direct current, which is used to charge the battery, thus making the battery being charged continuously during the time the charger is in operation. Since the capacitor charges ONLY during half of the cycle, this means it stores the energy for the next half-cycle, which is used in charging the battery. Also, due to the voltage difference at the capacitor and the battery being charged, all of the energy that makes up the difference in voltage is stored in the output capacitor (31). Since in order to charge a battery you reverse the current, which reverses the chemical action. For example, if the battery charger's output capacitor is 20 volts positive and the battery being charged is 16 volts positive, the current will travel from the positive terminal of said battery to the capacitor, thus reversing the current.

Again going back to terminal 6 of I.C. (15), a portion of the energy goes in series through a voltage dropping resistor (30) to terminal 1 of I.C. (15) and from terminal 1 a portion goes to an error amplifier in the I.C. (15) and the error amplifier is connected to the oscillator. Going back to terminal 1 of the I.C. (15), another portion of the energy goes from terminal 1 through a voltage divider potentiometer (28) to terminal 2 of the I.C. (15). Also, terminal 2 is connected to ground (35).

Going back to the output capacitor (31), voltge is controlled by a resistive voltage divider network. (Refer to block diagram shown on drawing and also to the I.C. (15) terminals identification listing.) A 1.2 volt precision reference is internally connected between the inverting input of the comparator and the substrate. The output voltage is established using a resistive voltage divider network whose node voltage is sensed by the noninverting input of the comparator. When the voltage at the noninverting input is more negative than the 1.2 volt reference, the oscillator is gated ON. When the voltage at the noninverting input is more positive than the 1.2 volt reference, the oscillator is gated OFF.

The oscillator frequency is controlled by a timing capacitor (29) that is connected to terminal 3 of the I.C. (15). Also, terminal 3 is connected to the oscillator. The other end of the frequency capacitor (29) is connected to terminal 4 of the I.C. (15) and terminal 4 is connected to ground (35). Also, terminal 4 is connected to a portion of the 1.2 volt reference in the I.C. (15) and the other portion of the 1.2 volt reference is connected to the error amplifier.

Going back to the potentiometer (28), this potentiometer (28) is used to adjust the voltage level that the output capacitor (31) charges to. Energy stored in the output capacitor (31) is transferred in series through a rectifier type diode (32). The anode is connected to the positive side of the output capacitor (31). The diode (32) cathode is connected in series with a current limiter (33) then energy is transferred through the current limiter (33) in series to the positive terminal (34) on the battery to be charged. In a normal operation, the output capacitor's (31) voltage is about 4 volts more than that of the battery that is being charged. When the battery that is being charged gets close to becoming fully charged, it goes under the 4 volt difference, but when the battery being charged is extra low it goes over the 4 volt difference, depending on where the potentiometer (28) is adjusted. The diode (32) is used to block the power from backing up from the battery that is being charged in the event the charger is left hooked-up with the switch (21) turned OFF.

The current limiter (33) is a lamp (bulb), also serves as an indicator light to show that the charger is working, plus helps to detect a dead cell or two by staying brighter when the battery is fully charged. Also, if the output power is shorter after going through the current limiter (33) the lamp absorbs all of the charger's output power without blowing the input fuse (22), plus indicating the short by going real bright. The reason the input fuse (22) doesn't blow is because of the current limit sense that the I.C. (15) has. When terminal 13 drops about 0.7 volt below terminal 14 this sensor will turn the power switch transistor OFF.

When the charger is in operation and you remove the output (34) load (battery) the charger draws only about 8 milliamperes of power from the input (16) to maintain the charge on the output capacitor (31) at a voltage level of 21 volts.

The balance of the terminals listed on the I.C. (15) are: The terminal 5 is connected to ground (35); Terminal 9 has no internal connections, so no external connection; Terminal 11 and terminal 12, unused. The drawing shows two ground references, input (17) and output (35). Really, both numbers are the same negative ground.

The following is a list and identification of the integrated circuit terminals (1 through 14) that are listed in the drawing:

1—COMPARATOR INPUT
2—INHIBIT
3—FREQUENCY CONTROL
4—SUBSTRATE
5—GND (ground)
6—CATHODE
7—ANODE
8—EMITTER
9—NC (no internal connection)
10—COLLECTOR
11—BASE
12—BASE DRIVE
13—CLS (current limit sense)
14—VCC (collector supply voltage, DC)

Also in the drawing:

15—BLOCK DIAGRAM OF THE IC Monalithic type, Malaysia brand, part #TL497-CJ (made in Taiwan)
16—INPUT POWER, 12 volt D.C. + (positive)
17—INPUT POWER, − (negative) ground
18—ZENER DIODE, 12 volt 1 watt (regulator)
19—INPUT FILTER CAPACITOR, Electrolytic, 470 MFD 25 volt
20—SILICON POWER RECTIFIER DIODE (protects circuit and regulator in case power is hooked up backwards)
21—ON-OFF POWER SWITCH
22—FUSE ¼ amp
23—INPUT REGULATOR RESISTOR, 300 ohms, ½ watt 5%
24—INPUT REGULATOR POWER TRANSISTOR, NPN type #2019
25—REGULATOR RESISTOR, 13 ohms, 2 watt 5%
26—CURRENT LIMITER RESISTOR, 5.1 ohms, 2 watt wire wound 5%
27—CHOKE, 250 uh powdered iron core, 2 amp.
28—OUTPUT VOLTAGE ADJUSTABLE POTENTIOMETER, 2-K ohms, ½ watt
29—FREQUENCY CAPACITOR, Silver Mica, 250 PF 500 volt 5%
30—OUTPUT VOLTAGE CONTROL RESISTOR, 20K ohms, ½ watt 5%
31—OUTPUT CAPACITOR, Electrolytic, 470 MFD, 25 volt
32—OUTPUT SILICON POWER RECTIFIER DIODE (protects circuit from power backing up from battery)
33—OUTPUT CURRENT LIMITER LAMP, #1892, 14.2 volts, 0.12 amp.
34—OUTPUT POWER, + (positive) this goes to the + terminal of the battery to be charged)
35—OUTPUT POWER, − (negative) this goes to the negative terminal of the battery to be charged).

The drawing is of a test model, which I built, utilizing an IC in the circuit. However, I feel that it is not imperitive to use an IC, as a variety of models with various specifications of D.C. Stepped-up Voltage Transformerless Battery Chargers can be made without leaving the scope of my invention. The following are results of tests taken of this test model while charging a 15 volt 450 MAH Nickel Cadmium Battery.

Test points are listed on the drawing;

A . . . Input: 12 volts D.C. at test point I
B . . . Input: 119 MA at test point I
C . . . Input: 10 volts D.C. at test point III
D . . . Input: 119 MA at test point III
E . . . Output: 20.25 volts D.C. at test point IV
F . . . Output: 46 MA at test point IV
G . . . Output: 16.75 volts D.C. at test point II
H . . . Output: 46 MA at test point II
I . . . Input: 8 MA at test point I, with output load removed. (This is the idle current.)
J . . . Input 165 MA at test point I, with output shorted
K . . . This circuit has 78% efficiency between test point III and test point IV.
L . . . The over-all total efficiency of this circuit between test point I and test point II, is 54%.

However, I do not want to be restricted to the parts, as listed in the test model, nor to the input voltage, as listed, nor to the output voltage, as listed. A wide range of parts as well as different input and output voltges can be used without leaving the scope of my invention.

I believe my invention provides a unique method of stepping up D.C. voltage from one battery to charge another battery with outstanding efficiency, is silent, lightweight, not bulky, and is economical.

Having thus described my invention, I claim:

1. An apparatus for charging a battery from a direct current voltage source comprising:

a filter capacitor connected across the input voltage terminals with the positive lead of said capacitor connected to the positive voltage terminal of said voltage source and the negative lead of said capacitor connected to the negative terminal of said voltage source;

a two-position single-pole power switch with means for connecting said switch to be in a conductive mode when said switch is in the ON position and further means for connecting said switch to terminate the power from said voltage source when said switch is in the OFF position;

a circuit protector comprising a fuse and a first rectifier, means for connecting one end of said fuse to said power switch and means for connecting said rectifier to be poled to blow said fuse upon receiving reverse polarity of said voltage source;

an input voltage regulating system comprising a first and a second resistor, one power transistor and one zener diode, means for connecting one end of the first resistor to the cathode end of the first rectifier, to the far side of said fuse, and the collector of said transistor, further means for connecting the other end of said resistor to the base of said transistor as well as to the cathode end of said zener diode, means for connecting the anode end of said zener diode to the ground, means for connecting the emitter of said transistor in series with the second resistor and to the input of the current limiter resistor, means for controlling said regulator, the said zener diode has a pre-determined voltage breakdown region upon conduction, diverts current from the base of said transistor thereby controlling said transistor's emitter voltage;

an oscillator having first, second, and third inputs and having an output, said first input of said oscillator is controlled by a first control means comprising a current limiter resistor and a current limit sense, means for connecting said current limiter resistor to said current limit sense, further means for connecting said current limit sense to said first input of said oscillator and means for said first control to turn off a power switch transistor in the switching system upon said current limit sense detecting a pre-determined voltage drop across said current limiting resistor thus protecting the battery charger's circuit from an overload;

a switching system comprising a fourth resistor, said power switch transistor, an inductor, a second rectifier, and an output capacitor, means for connecting said fourth resistor in series between said output of said oscillator and the base of said power switch transistor, means for connecting the emitter of said power switch transistor to ground, means for connecting said inductor in series between said current limit resistor and the collector of said power switch transistor, means for connecting said rectifier in series between said collector of said power switch transistor and said output capacitor, further means for connecting the negative terminal of said output capacitor to ground, means for said inductor to receive energy from said voltage source, means for said inductor to store energy and further means for transmitting said inductor's received and stored energy through said rectifier to charge said output capacitor, electronic switching means having an ON-state and an OFF-state, means for connecting said electronic switch to provide a current path to load said inductor when in the ON-state condition and further means for providing said inductor a current path to charge said output capacitor with said stored energy when said electronic switch is in the OFF-state condition, in normal operation said electronic switch is cycled ON and OFF at the same rate as the frequency of said oscillator;

means for regulating the charge level of said output capacitor comprises a resistive voltage divider network comprising a fifth resistor and a potentiometer, means for connecting one end of said resistor to said output capacitor and means for connecting the other end of said resistor to the first part of said potentiometer, further means for connecting the second and last parts of said potentiometer to the ground, further comprising a second control means for said second input of said oscillator wherein said second control means comprises an error amp, a 1.2 volt reference and a third rectifier, means for connecting the first part of said error amp to said first part of said potentiometer and means for connecting the second part of said error amp to the first part of said 1.2 volt reference and means for connecting the last part of said 1.2 volt reference to ground and further means for connecting the last part of said error amp to said second input of said oscillator, means for connecting said rectifier anode end to the ground and cathode end to said second input of said oscillator, said second control means wherein the voltage at the noninverting input is more negative than the 1.2 volt reference, the oscillator is gated ON, when the voltage at the noninverting input is more positive than the 1.2 volt reference, the oscillator is gated OFF thus regulating the charge level of the output capacitor;

a third control means for said third input of said oscillator wherein said third control means comprises a frequency timing capacitor, means for connecting said capacitor in series between said third input of said oscillator and ground, means wherein said timing capacitor is used to determine the frequency of said oscillator and further means for controlling said oscillator's frequency whether increased or decreased by said first control means or said second control means of said oscillator;

a system of transferring energy from said output capacitor to charge a battery comprising a fourth rectifier and a lamp, means for connecting said rectifier and said lamp in series between said output capacitor and said battery to be charged, means for transferring said energy from said output capacitor to said battery to be charged.

* * * * *